United States Patent
Yakimova et al.

(10) Patent No.: US 9,150,417 B2
(45) Date of Patent: Oct. 6, 2015

(54) PROCESS FOR GROWTH OF GRAPHENE

(75) Inventors: Rositsa Yakimova, Linkoping (SE); Tihomir Iakimov, Linkoping (SE); Mikael Syvajarvi, Ulrika (SE)

(73) Assignee: Graphensic AB, Linkoping (SE)

( * ) Notice: Subject to any disclaimer, the term of this patent is extended or adjusted under 35 U.S.C. 154(b) by 427 days.

(21) Appl. No.: 13/823,392

(22) PCT Filed: Mar. 23, 2011

(86) PCT No.: PCT/SE2011/050328
§ 371 (c)(1),
(2), (4) Date: Mar. 14, 2013

(87) PCT Pub. No.: WO2012/036608
PCT Pub. Date: Mar. 22, 2012

(65) Prior Publication Data
US 2013/0171347 A1    Jul. 4, 2013

(30) Foreign Application Priority Data
Sep. 16, 2010    (SE) ......................................  1050966

(51) Int. Cl.
*C01B 31/00* (2006.01)
*C01B 31/04* (2006.01)
*B82Y 30/00* (2011.01)
*B82Y 40/00* (2011.01)

(52) U.S. Cl.
CPC ............. *C01B 31/0446* (2013.01); *B82Y 30/00* (2013.01); *B82Y 40/00* (2013.01)

(58) Field of Classification Search
CPC ........................ C01B 31/0461; C01B 31/0446
See application file for complete search history.

(56) References Cited

U.S. PATENT DOCUMENTS

| 5,030,580 | A | * | 7/1991 | Furukawa et al. | ............ 438/508 |
| 7,071,258 | B1 | | 7/2006 | Jang et al. | |
| 2009/0155161 | A1 | * | 6/2009 | Yoon et al. | .................... 423/448 |

FOREIGN PATENT DOCUMENTS

| CN | 101602503 A | 7/2009 |
| CN | 101602503 B | 4/2011 |
| JP | 2009062247 | 3/2009 |
| WO | 2009119641 A1 | 3/2009 |

OTHER PUBLICATIONS

Emtsev et al., "Towards wafer-size graphene layers by atmospheric pressure graphitization of silicon carbide," Nature Materials, Mar. 2009, 8, pp. 203-208.*
Yakimova et al., "Analysis of the Formation Conditions for Large Area Epitaxial Graphene on SiC Substrates," Mat. Sci. Forums vols. 645-648, Apr. 2010, pp. 565-569.*
Juang et al, Synthesis of Graphene on silicon carbide substrates at low temperature, Carbon, vol. 47, Issue 8, Jul. 2009, pp. 2026-2031.
Tzalenchuk et al, Towards a quantum resistance standard based on epitaxial graphene, Nature Nanotechnology 5, (2010) pp. 186-189.

* cited by examiner

*Primary Examiner* — Robert Vetere
(74) *Attorney, Agent, or Firm* — Hayes Soloway PC

(57) ABSTRACT

The present disclosure relates to a process for growth of graphene at a temperature above 1400° C. on a silicon carbide surface by sublimation of silicon from the surface. The process comprises heating under special conditions up to growth temperature which ensured that the surface undergoes the proper modification for allowing homogenous graphene in one or more monolayers.

20 Claims, No Drawings

PROCESS FOR GROWTH OF GRAPHENE

The present invention relates in general to a process for growth of graphene on a silicon carbide substrate. More specifically, it relates to a process for growth of graphene by sublimation of silicon from a silicon carbide surface.

BACKGROUND

Graphene is a single layer of $sp^2$ bonded carbon atoms arranged in a hexagonal benzene-ring structure and is as such essentially two-dimensional. It has, as late as in 2003, been found to be present in ordinary graphite. Graphene is in graphite stacked along the c-axis of the structure via weak van der Waal forces. The strong covalent in-plane bonding and the weak inter-planar bonding forces determine the anisotropic properties of graphite. The presence of graphene in graphite has been demonstrated by peeling off graphene sheets by a simple scotch tape technique from graphite.

Graphene has lately attracted considerable attention due to its unique properties, such as very high electron mobility and efficient heat dissipation, making it interesting especially for the microelectronic industry. It is considered to be a potential successor for silicon in the continuing desire to miniaturize and produce more efficient electronic components.

Graphene may be produced by solid state graphitization by decomposition or sublimation of silicon atoms from a silicon carbide surface. During this process, silicon leaves the surface as a vapor whereas carbon atoms stay as a residue on the silicon carbide surface. Under arbitrary process conditions, the quality of the carbon on the surface is typically equivalent to amorphous graphite and such a surface is therefore often called graphitized. However, when process conditions are properly selected, the desired ordered honey-comb structure of carbon atoms may be formed on the surface. It is believed that the graphitization starts at about 1150° C. in ultra high vacuum. However, in order to achieve graphene, the temperature must be much higher.

One example of such a process is disclosed in CN101602503A wherein a 4H-SiC (0001) surface is cleaned and smoothened by hydrogen and propane, respectively, followed by silane so as remove surface oxides. Thereafter, graphene is grown on the surface by evaporation of silicon at 1590-1610° C. and 890-910 mbar argon pressure for 30-60 minutes. The process proposed by CN101602503 requires the initial steps of cleaning and smoothening making it relatively complex and expensive, and therefore does not seem to be a commercially viable process.

Tzalenchuk et al., "*Towards a quantum resistance standard based on epitaxial graphene*", Nature Nanotechnology, 5 (2010) 186, discloses that graphene can be grown epitaxially on silicon carbide. Graphene was grown at 2000° C. and 1 atm argon gas pressure, resulting in monolayers of graphene atomically uniform over more than 50 $\mu m^2$. Tzalenchuk et al. further discloses that graphene was grown on the Si-face of silicon carbide since the reaction kinetics is slower there than on the C-face because of higher surface energy, and that this fact aids in the control of the formation of homogenous graphene.

Other processes for production of graphene includes for example carbonizing a precursor polymer as disclosed in U.S. Pat. No. 7,071,258 B1, and chemical vapour deposition as disclosed in WO 2009/119641.

There is however still some fundamental obstacles to overcome before graphene based materials can reach their full potential and be commercially successful. For example, the previously mentioned processes are impractical for large-scale manufacturing as they tend to result in graphene layers which are not homogenous, layers which comprise grains or defects, and/or layers which suffer from strong variation in carrier density across the layers grown.

SUMMARY

The object of the present invention is a process for growth of graphene on a silicon carbide substrate which process is suitable for large-scale production and enables control of the thickness of the graphene grown.

The object is achieved by means of the process in accordance with independent claim 1. Embodiments are defined by the dependent claims.

The process according to the invention enables reliable growth of one or more monolayers of graphene on a large scale substrate surface. The fact that the process allows growth of homogenous graphene on areas of at least up to 50 mm diameter is important since it is crucial for device processing employing the expertise and facilities of existing microelectronics. Furthermore, the process does not require any complex or costly ex-situ substrate treatments such as hydrogen etching or oxygen removal by silicon flux. This is a result of the specific way of heating of the process, under which the substrate surface undergoes the proper modification for allowing reliable growth of graphene, and the conditions during growth of graphene. As a result, the process is more cost efficient and builds up additional commercial value compared to previously known processes.

The process according to the invention comprises positioning a silicon carbide substrate in a crucible and arranging said crucible in a reaction chamber, controlling the pressure and heating to the growth temperature, growing graphene on the surface of the substrate at a temperature above 1400° C. and at an inert gas pressure of between 600 and 1100 mbar. The heating is conducted in at least two stages. The first heating stage is conducted at a first heating rate up to a temperature of at least 1200° C. The second heating stage, which succeeds the first heating stage, is conducted at a second heating rate. The second heating rate is faster than the first heating rate. The heating may optionally comprise a third stage in which a third heating rate is used, the third heating rate preferably being faster than the second heating rate.

The first heating rate is preferably 20-30° C./min, more preferably 20-25° C./min, and the first heating stage is suitably conducted under vacuum conditions in order to avoid unwanted reactions with the substrate surface.

The second heating rate is preferably 25-35° C./min, more preferably 28-32° C./min, and is thus faster than the first heating rate. During the second heating stage, the surface of the silicon carbide surface will start to get graphitized. The second heating stage is suitably conducted under inert atmosphere. Thus, in accordance with an embodiment, inert gas is introduced into the reaction chamber after heating at said first heating rate and prior to heating at said second heating rate. It will be readily apparent to the skilled person that inert gas can also be introduced during the second heating stage. Furthermore, the pressure of the inert gas is preferably adjusted such that it corresponds to the inert gas pressure intended to be used during the growth of graphene, i.e. between 600 and 1100 mbar.

The third heating rate is preferably 30-40° C./min, more preferably 32-37° C./min, and is performed up to the desired growth temperature.

In accordance with one preferred embodiment of the process, the growth of graphene is conducted under essentially isothermal conditions. This ensures that silicon carbide deposition does not occur on the surfaces of the reaction crucible during growth of graphene, which is likely to occur in case temperature differences would be present.

In accordance with another preferred embodiment, the surface of the silicon carbide substrate is a silicon terminated surface since such a surface enables slower reaction kinetics compared to carbon terminated surfaces.

The growth temperature of graphene is at least 1400° C. However, it is preferred that the temperature is at least 1650° C., more preferably at least 1900° C. The time for growth is adjusted to the growth temperature, the substrate used and the desired number of graphene monolayers. It has been found that by changing the temperature and/or the time of growth of graphene of the process, it is possible to realize one, two, three or more monolayers of graphene on silicon or carbon terminated silicon carbide substrates in a fully reliable manner.

Preferably, the crucible is a closed crucible and the growth is performed without flow of gas though the crucible during growth. This ensures that silicon vapor will be allowed to escape from the crucible only slowly and consequently assist in the achieving a high quality graphene layer.

In accordance with yet another embodiment, the substrate is positioned in a graphite crucible whereby a carbon rich environment is achieved in the closed crucible. The working surface of the substrate, i.e. the surface on which the graphene is to be grown, is preferably arranged at a distance from and facing the bottom of the crucible during growth of graphene.

DETAILED DESCRIPTION

The invention will be described below in more detail with reference to various embodiments. It will be readily apparent to the skilled person that the invention is not limited to the embodiments described, but may be varied within the scope of the claims.

The process according to the present disclosure comprises positioning a silicon carbide substrate in an enclosed crucible and arranging said crucible in a reaction chamber of a furnace, controlling the pressure and heating to the growth temperature, growing graphene on the surface of the substrate at a temperature above 1400° C. and at an inert gas pressure of between 600 and 1100 mbar. The heating is conducted in at least two stages. The first heating stage is conducted at a first heating rate up to a temperature of at least 1200° C. The second heating stage, which succeeds the first heating stage, is conducted at a second heating rate. The second heating rate is faster than the first heating rate. The heating may optionally comprise a third stage in which a third heating rate is used, the third heating rate preferably being faster than the second heating rate.

The first heating stage is preferably conducted using a first heating rate of 20-30° C./min, more preferably 20-25° C./min, and is suitably conducted under vacuum conditions in order to avoid unwanted reactions with the substrate surface.

The second heating stage is preferably conducted using a second heating rate of preferably 25-35° C./min, more preferably 28-32° C./min and is suitably conducted under inert gas pressure. During the second heating rate, the surface of the silicon carbide surface will start to get graphitized.

The inert gas atmosphere during the second heating stage is suitably achieved by introducing inert gas, such as argon, into the reaction chamber and crucible after the first heating stage. Inert gas may also be introduced during the second heating stage. Preferably, the pressure of the inert gas is controlled such that it essentially corresponds to the intended inert gas pressure during growth of graphene, i.e. between 600 and 1100 mbar.

The third heating rate is preferably 30-40° C./min, more preferably 32-37° C./min, and is performed up to the desired growth temperature, such as about 2000° C. depending on the desired result. Naturally, the third heating stage is conducted under inert gas atmosphere and preferably at essentially the same pressure as the intended inert gas pressure during growth of graphene, i.e. between 600 and 1100 mbar.

In accordance with one preferred embodiment of the process, the growth of graphene is conducted under essentially isothermal conditions. The essentially isothermal condition ensures that undesired deposition of silicon carbide on the surfaces of the reaction crucible is minimized.

In accordance with another preferred embodiment, the surface of the silicon carbide substrate is a silicon terminated surface since such a surface enables slower reaction kinetics compared to carbon terminated surfaces.

The growth of graphene is conducted at an inert gas pressure of between 600 and 1100 mbar. Preferably, the inert gas pressure during the growth of graphene is at least 800 mbar, more preferably between about 950 and about 1050 mbar. The relatively high pressure of the inert gas during the growth of graphene has the effect that silicon atoms trying to leave the crucible will collide with ambient gas atoms, resulting in a prolonged residence time of silicon vapor in the vicinity of the substrate surface, which has the effect that the silicon vapor assists in flattening of the surface of the substrate thus improving the quality of the graphene layer.

The growth temperature of graphene is at least 1400° C. However, it is preferred that the temperature is at least 1650° C., more preferably at least 1900° C. The high temperature ensures that the carbon atoms of the surface have a high surface mobility and may therefore easily be rearranged on the surface, thus facilitating the formation of the graphene layer. The time for growth is adjusted to the growth temperature, the substrate used and the desired number of graphene monolayers. It has been found that by changing the temperature and/or the time of growth of graphene it is possible to realize one, two, three or more monolayers of graphene on silicon or carbon terminated silicon carbide substrates in a fully reliable manner using the process according to the invention.

During the growth of graphene, silicon will be sublimated from the silicon carbide substrate surface and forming a silicon vapor inside the crucible. However, the silicon vapor will be allowed to only slowly leave the crucible. This is a result of the inert gas atmosphere as well as the fact that the process is not performed with a gas flowing through the crucible. That is, the process is performed using a stationary inert gas atmosphere in the closed crucible. Preferably, the crucible may also be made of a graphite material with a low porosity to further minimize the escape rate of silicon vapor from the crucible. For example, the crucible may be made of highly dense graphite with high purity, i.e. density of about 1.85 Mg/cm$^3$ and total impurity level less than 0.2 ppm, respectively.

The fact that silicon vapor may only slowly leave the crucible ensures that silicon vapor assists in ensuring a good surface for graphene formation by assisting in flattening the substrate surface. Preferably, the partial pressure of silicon vapor inside the crucible during the growth of graphene is in the order of $10^{-5}$ mbar to $10^{-3}$ mbar, more preferably in the order of about $10^{-4}$ mbar.

In accordance with yet another embodiment, the substrate is positioned in a graphite crucible whereby a carbon rich environment is achieved in the enclosed crucible. The working surface of the substrate, i.e. the surface on which the graphene is to be grown, is preferably arranged at a distance from and facing the bottom of the crucible during growth of graphene.

The silicon carbide substrate may have any of the existing crystal structures, such as hexagonal, cubic or rhombohedral. Furthermore, it may be doped in any manner, such as n-typed, p-typed or semiinsulating. Graphene may be grown on any crystal plane of the silicon carbide. However, it is preferred that (0001) is used with precise orientation since this ensures the best results. Moreover, the silicon carbide substrate surface may be polar or non-polar (silicon, carbon mixed). It is however preferred that the surface is a silicon terminated surface since it is easier to control the formation of the homogenous graphene due to slower reaction kinetics compared to a carbon terminated face.

Before the silicon carbide substrate is inserted into the crucible and the reaction chamber, the substrate surface is cleaned using conventional wet chemical cleaning processes. The surface may of course be etched ex-situ by e.g. hydrogen or sublimation, even though this is not at all necessary in the process according to the invention.

The size of the substrate is not limiting to the process as such, and the process can be conducted on large scaled surfaces, such as substrates with diameters of more than 50 mm, with reliable results. In fact, it seems like the substrate manufacturing process is currently the limiting factor since substrates having precise crystallographic orientation are today only commercially available in sizes up to a diameter of up to about 100 mm. It has been found that such large substrates may be used without the monolayer(s) of graphene grown in accordance with the process according to the invention being interrupted or comprising defects. It should however be noted that it is important that the crystallographic orientation of the substrate surface is precise for ensuring uniformity of the graphene thickness.

The process according to the invention may suitably be conducted in an inductively heated high temperature furnace which allows heating up to about 2500° C., the furnace comprising a water cooled induction coil coupled to an RF generator. A reaction chamber is arranged in the furnace and may suitably be a vertically arranged quartz tube which is cooled by means of one or more fans. Furthermore, the reaction chamber advantageously comprises thermal insulation, preferably rigid porous graphite insulation, in order to ensure maintenance of the desired temperature.

The furnace should naturally also comprise gas lines for supply of inert gas and possible other gases, such as nitrogen and/or hydrogen, if desired. Moreover, the furnace is equipped with pumps, such as oil free pumps, for supplying a low base pressure before start of the process. Preferably, a base pressure in the order of $10^{-6}$ mbar is used as a base pressure. The base pressure is controlled after insertion of the crucible in the reaction chamber in the furnace but before heating to the desired growth temperature.

The furnace may also comprise a glove box with a load lock providing an inert atmosphere during substrate loading stage into the furnace.

Furthermore, the furnace should also comprise means for measuring the temperature inside the reaction chamber. This may for example be achieved by optical pyrometers arranged for example at the top and/or bottom of the reaction chamber. Such optical pyrometers may typically give a temperature reading accuracy of less than 10° C.

The silicon carbide substrate is positioned in a crucible arranged inside the reaction chamber during the process. The crucible is preferably embedded in the thermal insulation of the reaction chamber such that temperature gradients are essentially avoided. This has the effect that essentially isothermal conditions are achieved during the process.

In accordance with one embodiment of the invention, the crucible is made of graphite. This ensures that the substrate is subjected to a carbon rich environment during the heating of the substrate and the growth of graphene on the surface of the substrate. Moreover, the substrate is preferably arranged such that the surface of the substrate on which the graphene should be grown is arranged facing the bottom of the crucible.

One particular example of the process according to the invention comprises the steps:

I. Cleaning of the silicon carbide substrate surface using wet chemical cleaning finalized by dipping in HF solution
II. Positioning the substrate in a graphite crucible, preferably with the working surface facing the bottom of the crucible without being in contact with the surface of the crucible, and closing the crucible
III. Arranging thermal insulation around the crucible in order to ensure isothermal conditions in the crucible
IV. Loading into a reaction chamber of a furnace (as previously disclosed)
V. Starting pumping and maintaining the pressure, until a stable base pressure, for example about $10^{-6}$ mbar, has been reached
VI. Heating by means of RF generator with a specific temperature ramp as follows
 a. Heating during about one hour with a heating rate of about 23° C./min under vacuum and thereafter introducing inert gas, preferably argon, for example at a flow rate of about 400-600 ml/minute
 b. Heating during about 13 minutes with a heating rate of about 30° C./min
 c. Heating during about 5 minutes with a heating rate of about 35° C./min to the desired growth temperature and required gas pressure
VII. Growth of graphene under inert gas pressure of 600-1000 mbar up to about 60 minutes depending on the temperature and crystallographic orientation of the substrate, and the desired number of graphene monolayers
VIII. Termination of growth by switching of the RF generator and allowing the substrate to cool down to room temperature.

The invention claimed is:

1. Process for growth of graphene on a silicon carbide substrate by sublimation of silicon from the silicon carbide substrate surface, the process comprising positioning a silicon carbide substrate in a crucible and arranging said crucible in a reaction chamber, controlling the pressure and heating to the growth temperature, growing graphene on the surface of the substrate at a temperature above 1400° C. and at an inert gas pressure of between 600 and 1100 mbar, wherein said heating is conducted in at least a first heating stage and a second heating stage, the first heating stage being conducted at a first heating rate up to a temperature of at least 1200° C., and the second heating stage being conducted after the first heating stage and at a second heating rate which is faster than the first heating rate, wherein inert gas is introduced into the reaction chamber after heating at said first heating rate and prior to heating at said second heating rate.

2. Process according to claim 1 wherein said first heating rate is 20-30° C./min.

3. Process according to claim 1 wherein said second heating rate is 25-35° C./min.

4. Process according to claim 1 wherein said heating further comprises a third heating stage after said second heating stage, the third heating stage being conducted at a third heating rate which is faster than the second heating rate.

5. Process according to claim 4 wherein said third heating rate is 30-40° C./min.

6. Process according to claim 1 wherein the growth of graphene is conducted under essentially isothermal conditions.

7. Process according to claim 1 wherein the second heating stage is performed under inert gas atmosphere.

8. Process in accordance with claim 1 wherein the surface of the silicon carbide substrate is a silicon terminated surface.

9. Process according to claim 1 wherein the growth of graphene is conducted at a temperature of at least 1650° C.

10. Process according to claim 1 wherein the growth of graphene is conducted at a temperature of at least 1900° C.

11. Process according to claim 1 wherein the substrate is positioned in a graphite crucible.

12. Process according to claim 11 wherein the working surface of the substrate is arranged at a distance from and facing the bottom of the crucible during growth of graphene.

13. Process according to claim 1 wherein the crucible is closed during the growth of graphene.

14. Process for growth of graphene on a silicon carbide substrate by sublimation of silicon from the silicon carbide substrate surface, the process comprising positioning a silicon carbide substrate in a crucible and arranging said crucible in a reaction chamber, controlling the pressure and heating to the growth temperature, growing graphene on the surface of the substrate at a temperature above 1400° C. and at an inert gas pressure of between 600 and 1100 mbar, wherein said heating is conducted in at least a first heating stage and a second heating stage, the first heating stage being conducted at a first heating rate up to a temperature of at least 1200° C., and the second heating stage being conducted after the first heating stage and at a second heating rate which is faster than the first heating rate, wherein the first heating stage is performed under vacuum.

15. Process according to claim 14 wherein said first heating rate is 20-30° C./min.

16. Process according to claim 14 wherein said second heating rate is 25-35° C./min.

17. Process according to claim 14 wherein said heating further comprises a third heating stage after said second heating stage, the third heating stage being conducted at a third heating rate which is faster than the second heating rate.

18. Process according to claim 17 wherein said third heating rate is 30-40° C./min.

19. Process according to claim 14 wherein the growth of graphene is conducted under substantially isothermal conditions.

20. Process according to claim 14 wherein the second heating stage is performed under inert gas atmosphere.

* * * * *

UNITED STATES PATENT AND TRADEMARK OFFICE
CERTIFICATE OF CORRECTION

PATENT NO.        : 9,150,417 B2
APPLICATION NO.   : 13/823392
DATED             : October 6, 2015
INVENTOR(S)       : Yakimova et al.

Page 1 of 1

It is certified that error appears in the above-identified patent and that said Letters Patent is hereby corrected as shown below:

Title Page, Item (30), Foreign Application Priority Data "1050966" should be
-- 1050966-9 --

Signed and Sealed this
Ninth Day of August, 2016

Michelle K. Lee
*Director of the United States Patent and Trademark Office*